US012641022B2

(12) United States Patent
Joshi et al.

(10) Patent No.: US 12,641,022 B2
(45) Date of Patent: May 26, 2026

(54) SELECTIVE PROGRAMMING OF FORWARDING HARDWARE OF A SWITCH

(71) Applicant: Hewlett Packard Enterprise Development LP, Spring, TX (US)

(72) Inventors: Vinayak Joshi, Bangalore (IN); Venkatavaradhan Devarajan, Bangalore (IN); Rajib Majila, Bangalore (IN); Vijeesh Erankotte Panayamthatta, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 685 days.

(21) Appl. No.: 18/097,975

(22) Filed: Jan. 17, 2023

(65) Prior Publication Data

US 2024/0244000 A1 Jul. 18, 2024

(51) Int. Cl.

| | |
|---|---|
| *H04L 45/745* | (2022.01) |
| *H04L 12/46* | (2006.01) |
| *H04L 45/00* | (2022.01) |
| *H04L 45/12* | (2022.01) |

(52) U.S. Cl.
CPC ........ *H04L 45/745* (2013.01); *H04L 12/4641* (2013.01); *H04L 45/12* (2013.01); *H04L 45/66* (2013.01)

(58) Field of Classification Search
CPC ....... H04L 45/745; H04L 45/12; H04L 45/66; H04L 12/4641
See application file for complete search history.

(56) References Cited

U.S. PATENT DOCUMENTS

| | | | | |
|---|---|---|---|---|
| 11,777,899 B1 * | 10/2023 | Durrani | ............... | H04L 61/5014 |
| | | | | 709/245 |
| 2019/0199587 A1 * | 6/2019 | Mudigonda | ............... | G06F 9/46 |
| 2020/0067830 A1 * | 2/2020 | Malhotra | ................ | H04L 12/66 |
| 2020/0177503 A1 * | 6/2020 | Hooda | ............... | H04L 12/4641 |
| 2020/0382471 A1 * | 12/2020 | Janakiraman | ....... | H04L 61/5007 |
| 2021/0234898 A1 * | 7/2021 | Desai | .................... | H04L 63/104 |
| 2022/0255835 A1 * | 8/2022 | Mohanty | ............. | H04L 12/4641 |
| 2023/0188382 A1 * | 6/2023 | Nath | ........................ | H04L 45/26 |
| | | | | 709/222 |
| 2024/0048485 A1 * | 2/2024 | Janakiraman | ........... | H04L 45/04 |
| 2024/0134673 A1 * | 4/2024 | Srinivasan | .......... | H04L 41/0843 |

* cited by examiner

*Primary Examiner* — Blake J Rubin
(74) *Attorney, Agent, or Firm* — Hewlett Packard Enterprise Patent Department

(57) ABSTRACT

A system for selectively programming the forwarding hardware of a switch is provided. During operation, the system can operate the switch as a tunnel endpoint of a tunnel in conjunction with a remote switch. The tunnel can facilitate a virtual private network (VPN). The system can determine, using a routing protocol, a set of routes for the VPN. The system can maintain the set of routes in a first data structure in an application space. The set of routes can include a first subset of routes to remote hosts of the VPN and a second subset of routes comprising the rest of the set of routes. The system can program the second subset routes in the forwarding hardware. Upon receiving a packet for a remote host, the system can determine a route to the remote host from the first set of routes and program the route in the forwarding hardware.

20 Claims, 10 Drawing Sheets

SELECTIVE PROGRAMMING OF FORWARDING HARDWARE OF A SWITCH

BACKGROUND

Field

The present disclosure relates to communication networks. More specifically, the present disclosure relates to a method and system for selectively programming the forwarding hardware of a switch based on inter-host traffic.

BRIEF DESCRIPTION OF THE FIGURES

In the figures, like reference numerals refer to the same figure elements.

DETAILED DESCRIPTION

Figure 1:
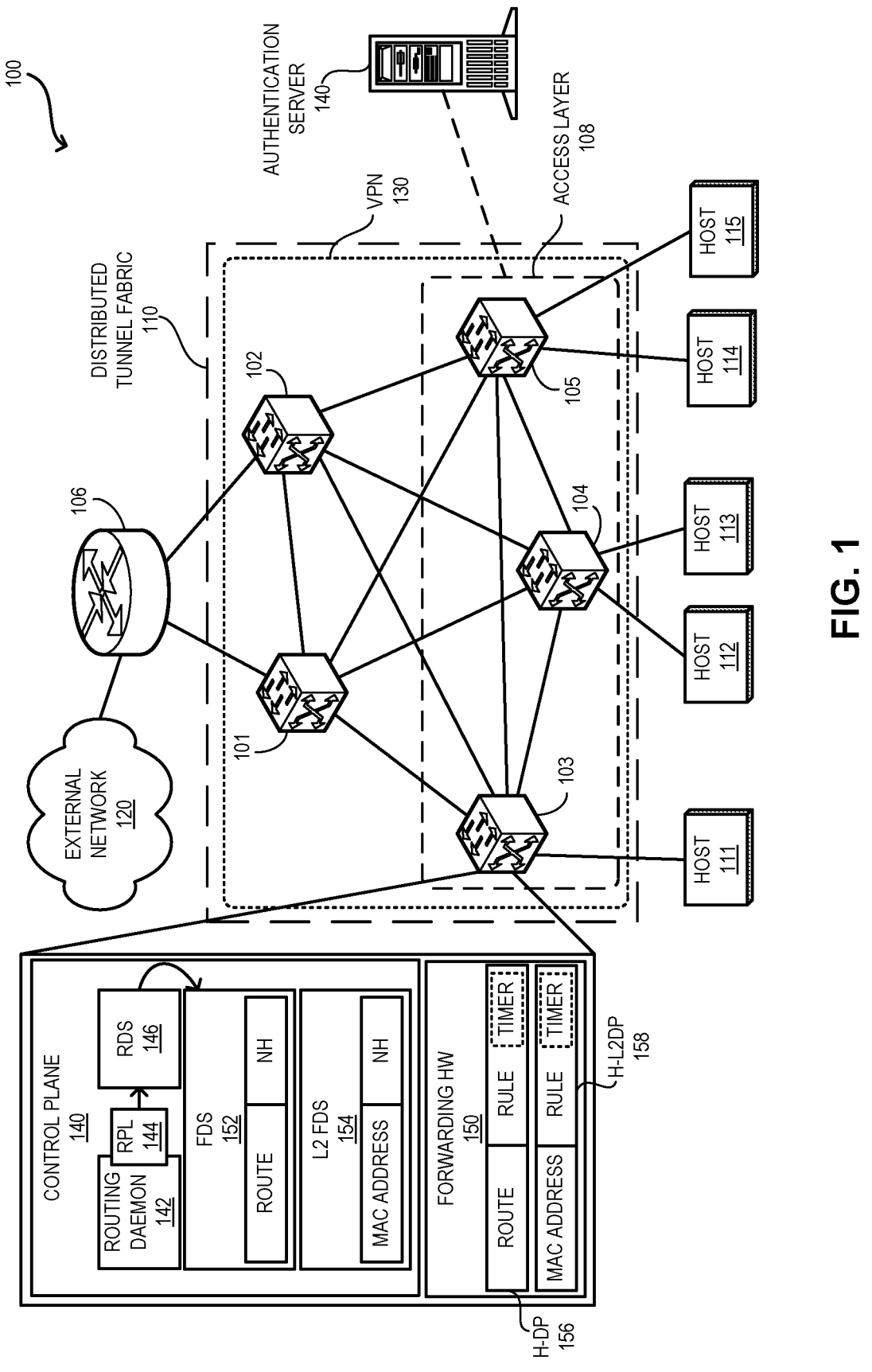
FIG. 1 illustrates an example of a network supporting selective programming of the forwarding hardware of a respective access switch, in accordance with an aspect of the present application.

The following description is presented to enable any person skilled in the art to make and use the invention, and is provided in the context of a particular application and its requirements. Various modifications to the disclosed examples will be readily apparent to those skilled in the art, and the general principles defined herein may be applied to other examples and applications without departing from the spirit and scope of the present invention. Thus, the present invention is not limited to the aspects shown, but is to be accorded the widest scope consistent with the claims.

The Internet is the delivery medium for a variety of applications running on physical and virtual devices. Such applications have brought with them an increasing traffic demand. As a result, equipment vendors race to build switches with versatile capabilities. To do so, a switch may support different protocols and services. For example, the switch can support tunneling and virtual private networks (VPNs). The switch can then facilitate overlay routing for a VPN over the tunnels. For example, an Ethernet VPN (EVPN) can be deployed as an overlay over a set of virtual extensible local area networks (VXLANs). To deploy a VPN over the tunnels, a respective tunnel endpoint may map a respective client virtual local area network (VLAN) to a corresponding tunnel network identifier (TNI), which can identify a virtual network for a tunnel.

The TNI may appear in a tunnel header that encapsulates a packet and is used for forwarding the encapsulated packet via a tunnel. For example, if the tunnel is formed based on VXLAN, the TNI can be a virtual network identifier (VNI) of a VXLAN header, and a tunnel endpoint can be a VXLAN tunnel endpoint (VTEP). A TNI can also be mapped to the virtual routing and forwarding (VRF) associated with the tunnels if layer-3 routing and forwarding are needed. Since a VPN can be distributed across the tunnel fabric, a VPN over the tunnel fabric can also be referred to as a distributed tunnel fabric.

A distributed tunnel fabric is typically deployed over tunnels formed among different classes of switches. For example, if a network includes core and access switches, the fabric can include tunnels formed among the core switches as well as between core and access switches. As a result, different classes of switches can operate as the tunnel endpoints of the fabric and facilitate routing over the tunnels. On the other hand, access switches can typically connect hosts (e.g., end devices, cameras, printers, etc.). The access switches can receive the packets from hosts (or client devices) based on the underlying network (or an underlay network) of the fabric and forward the packets via the fabric.

The aspects described herein solve the problem of efficiently utilizing the limited hardware resources of an access (or edge) switch of a fabric by (i) programming a host route or MAC address into the forwarding hardware from the corresponding forwarding data structures if a corresponding inter-host communication is initiated; and (ii) removing the host route or MAC address from the forwarding hardware when the inter-host communication is terminated. The switch can initially store the route information and learned host MAC addresses in respective forwarding data structures. However, the switch can only program the routes toward core switches into the forwarding hardware without programming the host routes. By selectively programming host routes or MAC addresses when needed, the switch can efficiently utilize the limited resources of the local forwarding hardware.

Typically, hosts, which can be user or client devices, need to authenticate to connect to a VPN (e.g., based on an authentication process). Examples of hosts can include, but are not limited to, laptops, desktops, printers, cellphones, tablets, Internet of Things (IoT) devices, and appliances. With existing technologies, a host can be coupled to an access switch for accessing the fabric. The access switch can then authenticate the host from an authentication server based on the authentication process, such as port-based or username/password-based authentication. The port-based authentication can be based on the Institute of Electrical and Electronics Engineers (IEEE) 802.1X standard. Based on the successful authentication, the access switch can determine a host type and allocate a VLAN to the host based on the host type.

Subsequently, the host can obtain an IP address belonging to a subnet associated with the VLAN. However, the VLAN can be configured across multiple access switches. As a result, the corresponding subnet can be distributed among the access switches, each of which can be reachable via one or more tunnels in the fabric. This process of distributing a subnet across the tunnels of an overlay network can be referred to as subnet stretching. To facilitate subnet stretching, a respective access switch can learn the route to a respective host, which can be referred to as a host route. The switch can also program the host route into the local forwarding hardware (e.g., the application-specific integrated circuit (ASIC) of the switch). For example, the forwarding hardware can include one or more ternary content-addressable memory (TCAM) units. A respective host route and the corresponding next-hop switch can be stored in an entry of the TCAM.

A plurality of hosts can be in a subnet stretched across a set of access switches. A respective access switch can then learn the subnet prefix (e.g., a prefix route) with the set of access switches as the next-hop switches. The switch can run a routing protocol instance (e.g., a routing daemon) to learn a respective route. For example, if a fabric uses Border Gateway Protocol (BGP) to establish routes, the BGP instance on the access switches can determine respective routes to the hosts. If equal-cost multi-path routing (ECMP) is enabled for the routing protocol, each of the set of access switches can be programmed as a next-hop switch for the prefix route in the forwarding hardware. Otherwise, one of the set of access switches can be selected as the next-hop switch by the routing protocol and programmed accordingly. However, the selected next-hop switch may not provide the shortest path to all the hosts of the subnet.

To avoid this, the access switches typically learn host routes in addition to the prefix routes. The host route can be based on the IP address of a host and include an identifier of the access switch via which the IP address is reachable. For example, if a host's IP address is A.B.C.D, the prefix and host route can be A.B.C.0/24 and A.B.C.D/32, respectively. The host route can also indicate the access switch coupling the host as the next-hop switch. Due to the access switch coupling hosts belonging to different subnets, the number of host routes learned and programmed by the switch can be up to the total number of hosts in the fabric. As a result, a large number of host routes can be programmed into the forwarding hardware of the switch. However, in a typical distributed network, traffic flows among hosts are rare and short-lived. Nonetheless, the host routes occupy the limited resources available at the forwarding hardware without being utilized.

To solve this problem, the routing daemon, which can run the routing protocol instance, of the access switch can maintain the host routes in a forwarding data structure (FDS) in the application space of the routing daemon (e.g., in the software). A host route can be programmed into the forwarding hardware from the FDS to facilitate a data plane (DP) if a corresponding inter-host communication is initiated. During operation, the routing daemon can determine a respective route associated with the access switch. The routing daemon can then store the routes in a routing data structure (RDS), such as a routing information base (RIB).

The RDS can also be maintained in the application space of the routing daemon. The routes in the RDS can be prefix routes and host routes.

The routing daemon can then determine the path associated with a respective route in the RDS and populate the FDS. The FDS can be a forwarding information base (FIB). A respective entry in the FDS can indicate a next-hop switch for a corresponding route. A respective prefix route can then be programmed for the data plane into the forwarding hardware. The switch can also program local host routes (i.e., for which the local switch is the next-hop switch) into the forwarding hardware. However, the forwarding hardware does not program the rest of the host routes. Instead, a prefix route for hosts can be programmed with a rule for the data plane. The rule can indicate that if the destination Internet Protocol (IP) address of a packet matches the prefix, the IP address should be looked up in the FDS in the application space. When the host route associated with the IP address is identified in the FDS, the switch can program the host route in an entry in the forwarding hardware (e.g., a TCAM entry).

The switch can also initiate a timer for the entry and forward subsequent packets of the flow based on the entry of the forwarding hardware. Even though the destination IP address of these packets can also match the prefix route, the host route can provide the longest-prefix match in the data plane. Upon determining a respective match for the host route in the data plane, the timer can be reset. If the forwarding hardware does not observe traffic for the flow for a predetermined period, the timer can expire. The forwarding hardware can then remove the entry from the forwarding hardware. In this way, the forwarding hardware at a respective access switch of a network can selectively program a host route when needed and efficiently utilize the limited resources (e.g., available space) in the forwarding hardware.

Selectively programming forwarding information can also be extended to layer-2 information. When an access switch learns a MAC address, the EVPN protocol shares that MAC address with all switches. Hence, the forwarding hardware of the access switch also needs to store a large number of MAC addresses. Such high-capacity hardware can be expensive and unsuitable for widely deployable access switches. To solve this problem, a respective MAC address learned via the EVPN can be stored in a layer-2 FDS (L2FDS) maintained in the application space of the layer-2 daemon. The forwarding hardware of the switch can maintain a rule for the MAC addresses in the data plane. The rule can indicate that a MAC address absent in the forwarding hardware should be looked up in the L2FDS in the application space.

Accordingly, upon receiving a packet with a destination MAC address, the switch can obtain the corresponding entry from the L2FDS and program the entry into the forwarding hardware. The switch can also initiate a timer for the entry and forward subsequent packets with the destination MAC address based on the entry in the forwarding hardware. If the forwarding hardware does not observe the destination MAC address for a predetermined period, the timer can expire. The forwarding hardware can then remove the entry from the forwarding hardware. In this way, the access switch can operate with relatively low-capacity forwarding hardware without changing the existing EVPN protocol.

In this disclosure, the term "switch" is used in a generic sense, and it can refer to any standalone or fabric switch operating in any network layer. "Switch" should not be interpreted as limiting examples of the present invention to layer-2 networks. Any device that can forward traffic to an external device or another switch can be referred to as a "switch." Any physical or virtual device (e.g., a virtual machine or switch operating on a computing device) that can forward traffic to an end device can be referred to as a "switch." Examples of a "switch" include, but are not limited to, a layer-2 switch, a layer-3 router, a routing switch, a component of a Gen-Z network, or a fabric switch comprising a plurality of similar or heterogeneous smaller physical and/or virtual switches.

The term "packet" refers to a group of bits that can be transported together across a network. "Packet" should not be interpreted as limiting examples of the present invention to a particular layer of a network protocol stack. "Packet" can be replaced by other terminologies referring to a group of bits, such as "message," "frame," "cell," "datagram," or "transaction." Furthermore, the term "port" can refer to the port that can receive or transmit data. "Port" can also refer to the hardware, software, and/or firmware logic that can facilitate the operations of that port.

FIG. 1 illustrates an example of a network supporting selective programming of the forwarding hardware of a respective access switch, in accordance with an aspect of the present application. A network 100 can include a number of switches and devices, and may include heterogeneous network components, such as layer-2 and layer-3 hops, and tunnels. In some examples, network 100 can be an Ethernet, InfiniBand, or other network, and may use a corresponding communication protocol, such as Internet Protocol (IP), FibreChannel over Ethernet (FCoE), or other protocol. Network 100 can include a distributed tunnel fabric 110 comprising switches 101, 102, 103, 104, and 105. A respective switch in a respective fabric can be associated with a MAC address and an IP address. Switches in fabric 110 can be coupled to each other via a tunnel. Switches 101 and 102 can be coupled to an external switch 106 (e.g., a switch in the campus core) via which an external network 120 (e.g., a remote site of an enterprise network) is reachable. Hence, switches 101 and 102 can be referred to as border switches.

Switches of fabric 110 may form a mesh of tunnels. Examples of a tunnel can include, but are not limited to, VXLAN, Generic Routing Encapsulation (GRE), Network Virtualization using GRE (NVGRE), Generic Networking Virtualization Encapsulation (Geneve), Internet Protocol Security (IPsec), and Multiprotocol Label Switching (MPLS). The tunnels in a fabric can be formed over an underlying network (or an underlay network). The underlying network can be a physical network, and a respective link of the underlying network can be a physical link. A respective switch pair in the underlying network can be a Border Gateway Protocol (BGP) peer. A VPN 130, such as an EVPN, can be deployed over fabric 110.

Fabric 110 can include an access layer 108 of access switches 103, 104, and 105. A respective aggregate switch can aggregate traffic from one or more downstream access switches. Access layer 108 can facilitate access to fabric 110 to a number of hosts 111, 112, 113, 114, and 115. Examples of hosts can include, but are not limited to, laptops, desktops, printers, cellphones, tablets, IoT devices, and appliances. Access switch 103 can provide access coverage to host 111. Similarly, access switch 104 can provide access coverage to hosts 112 and 113, and access switch 105 can provide access coverage to hosts 114 and 115. When a host, such as host 111, is coupled to the corresponding switch 103 via a wired or wireless link, switch 103 can provide access coverage to host 111. Typically, host 111 may need to authenticate to connect to VPN 130 (e.g., based on an authentication process). Switch 103 can facilitate the authentication process to host 111.

With existing technologies, when host 111 initiates communication with fabric 110, switch 103 can authenticate host 111 from an authentication server 140 based on the authentication process, such as port-based or username/password-based authentication. The port-based authentication can be based on the Institute of Electrical and Electronics Engineers (IEEE) 802.1X standard. Based on the successful authentication, switch 103 can determine a host type and allocate a VLAN to host 111 based on the host type. Subsequently, host 111 can obtain an IP address belonging to a subnet associated with the VLAN. However, the VLAN can be configured across switches 103, 104, and 105. As a result, the corresponding subnet can be distributed among switches 103, 104, and 105 of fabric 110. This process of distributing a subnet across the tunnels of an overlay network, such as fabric 110, can be referred to as subnet stretching.

To facilitate subnet stretching, each of switches 103, 104, and 105 can learn a respective host route. For example, switch 103 can learn the host routes to hosts 111, 112, 113, 114, and 115. Switch 103 can also program host routes into local forwarding hardware 150. Forwarding hardware 150 can include one or more TCAM units. A routing daemon 142 of switch 103 can run in control plane 140 since routing is a control plane operation of a switch. Control plane 140 can run on the operating application (e.g., the network operating system) of switch 103. Routing daemon 142 can run a routing protocol instance 144 (e.g., a BGP instance) to learn a respective route. Routing protocol instance 144 can learn the prefix routes associated with external switch 106 and external network 120. In addition, routing protocol instance 144 can also learn the prefix routes associated with hosts 111, 112, 113, 114, and 115.

In this example, a plurality of hosts can be in a subnet stretched across switches 103, 104, and 105. Hence, access switch 103 can also learn host routes to hosts 111, 112, 113, 114, and 115. The host route can also indicate the access switch coupling the host as the next-hop switch. For example, from switch 103, host 112's next-hop switch can be switch 104. Due to switch 103 learning host routes of a respective host coupling access layer 108, the number of host routes learned and programmed by switch 103 can be up to the total number of hosts coupling fabric 110. As a result, a large number of host routes can be programmed into forwarding hardware 150. However, in fabric 110, traffic flows among hosts are rare and short-lived. Nonetheless, the host routes occupy the limited resources available in forwarding hardware 150 without being utilized.

To solve this problem, routing daemon 142 can maintain the host routes in an FDS 152 (e.g., an FIB) in the application space of routing daemon 142 without programming them in forwarding hardware 150. A host route can be programmed into forwarding hardware 150 from FDS 152 for a data plane 156 if a corresponding inter-host communication is initiated. During operation, routing daemon 142 can determine a respective route associated with the access switch. Routing daemon 142 can then store the routes in an RDS 146 (e.g., an RIB). RDS 146 can also be maintained in the application space of routing daemon 142. The routes in RDS 146 can be prefix routes and host routes. Routing daemon 142 can then determine the path associated with a respective route in RDS 146 and populate FDS 152.

A respective entry in FDS 152 can indicate a next-hop switch for a corresponding route. A respective prefix route of FDS 152 can then be programmed into forwarding hardware 150. Switch 103 can also program local host routes, such as host route to locally coupled host 111, into forwarding hardware 150. However, the rest of the host routes are not programmed into forwarding hardware 150. Instead, the prefix routes representing the respective subnet prefix of the host routes can be programmed with a corresponding rule for data plane 156. The rule can indicate that if the destination IP address of a packet matches the prefix in data plane 156, the packet should be promoted to control plane 140 and looked up in FDS 152. Hence, the rule can be a reference to FDS 152. When the host route associated with the IP address is identified in FDS 152, switch 103 can program the host route in an entry in forwarding hardware 150 (e.g., a TCAM entry). Consequently, forwarding hardware 150 can forward subsequent packets of the flow based on the entry. Even though the destination IP address of these packets can also match the prefix route, the host route can provide the longest-prefix match in data plane 156.

Switch 103 can also initiate a timer for the entry to ensure that the entry remains in H-FDS 156 only when the entry is used for forwarding traffic. Upon determining a respective match for the host route in data plane 156, the timer can be reset. If forwarding hardware 150 does not observe traffic for the flow for a predetermined period, the host route does not produce a match in data plane 156. As a result, the timer associated with the entry can expire. Forwarding hardware 150 can then remove the entry. In this way, forwarding hardware 150 can selectively program a host route when needed and efficiently utilize the limited resources (e.g., available space) in forwarding hardware 150.

Selectively programming forwarding information can also be extended to layer-2 information associated with fabric 110. When switch 105 learns the MAC address of host 115, the VPN protocol instance associated with VPN 130 can share that MAC address with all switches in VPN 130. Accordingly, switch 103 can learn the MAC address via the VPN protocol instance and store the learned MAC address in forwarding hardware 150. Hence, forwarding hardware 150 may also need to store a large number of MAC addresses. To solve this problem, a respective MAC address learned via VPN 130 can be stored in L2FDS 154 in control plane 140 without programming forwarding hardware 150. Instead, forwarding hardware 150 can maintain a rule for the learned MAC addresses. The rule can indicate that a MAC address absent in forwarding hardware 150 should be looked up in L2FDS 154.

However, forwarding hardware 150 can store locally learned MAC addresses, such as the MAC address of host 111. Upon receiving a packet with a destination MAC address, switch 103 can look up the MAC address in forwarding hardware 150. If no match is found, switch 103 can obtain the corresponding entry from L2FDS 154 and program the entry into forwarding hardware 150. Switch 103 can also initiate a timer for the entry and forward subsequent packets with the destination MAC address based on the entry. If forwarding hardware 150 does not observe the MAC address for a predetermined period, the timer can expire. Forwarding hardware 150 can then remove the entry. In this way, switch 103 can efficiently operate with existing VPN-based MAC address sharing without requiring a large capacity for forwarding hardware 150.

Figure 2A:
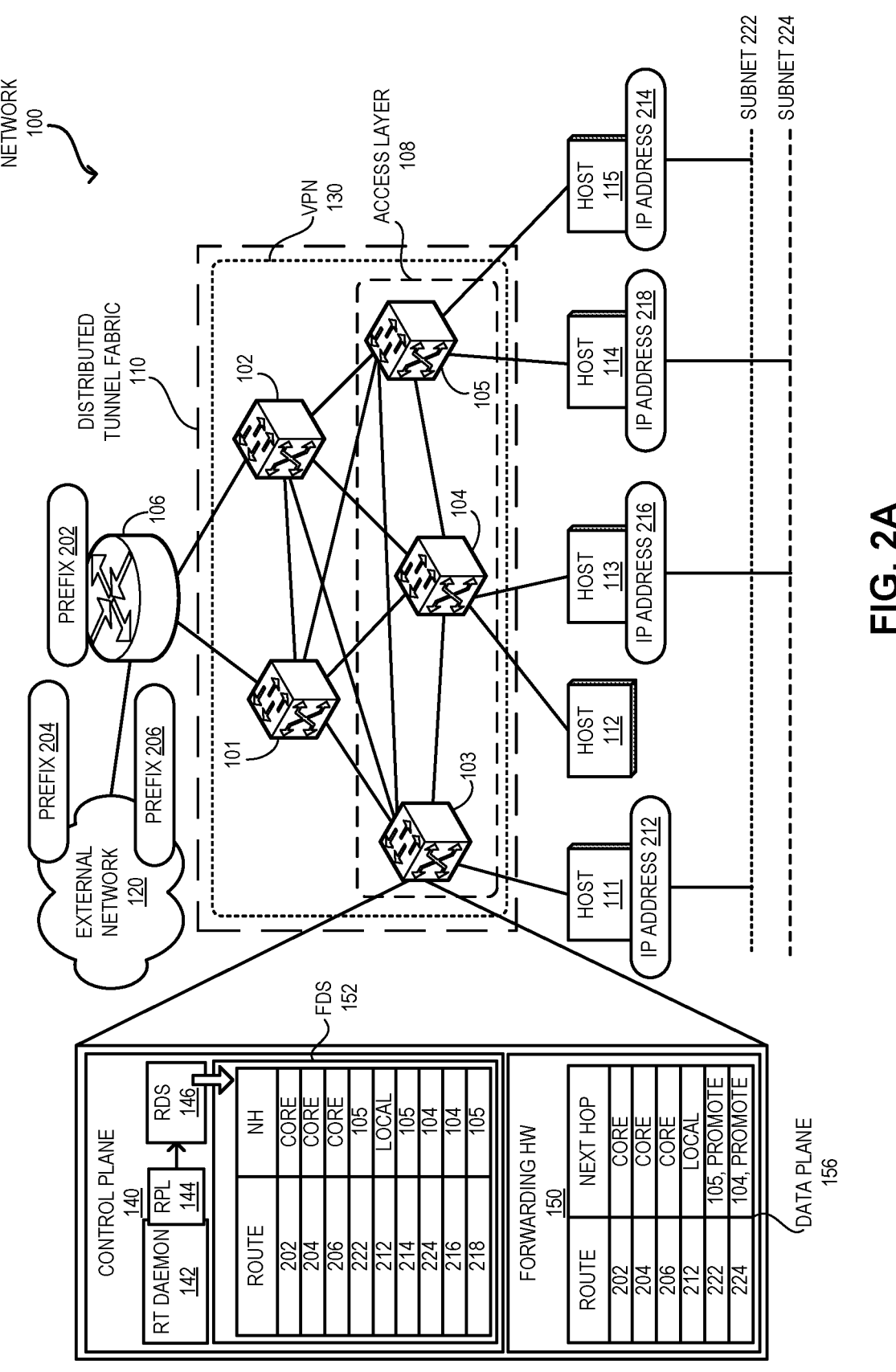
FIG. 2A illustrates an example of an access switch supporting selective programming of host routes into the local forwarding hardware, in accordance with an aspect of the present application.

FIG. 2A illustrates an example of an access switch supporting selective programming of host routes into the local forwarding hardware, in accordance with an aspect of the present application. Hosts 111, 113, 114, and 115 can be allocated with IP addresses 212, 216, 218, and 214, respectively. In this example, IP addresses 212 and 214 can belong to subnet 222, and IP addresses 216 and 218 can belong to subnet 224. Therefore, subnets 222 and 224 can be stretched across access layer 108. Consequently, the routing protocol instance of a respective access switch, such as routing protocol instance 144 of switch 103, can learn the host routes to respective hosts.

During operation, routing daemon 142 can learn the routes in network 100 and store the learned routes in RDS 146. A respective entry can include the route (e.g., a prefix) and a next-hop switch associated with the route. Typical routes learned using routing protocol instance 144 can mostly include prefix routes. For example, routing protocol instance 144 can learn an IP prefix 202 from switch 106, and IP prefixes 204 and 206 are associated with network 120 via switch 106. In addition, routing protocol instance 144 can learn prefix routes corresponding to subnets 222 and 224. For example, host 115's IP address 214 can be A.B.C.D. The subnet prefix for subnet 222 can then be A.B.C.0/24. Routing protocol instance 144 can then learn the prefix and host routes as A.B.C.0/24 and A.B.C.D/32, respectively.

For a respective route, routing daemon 142 can also determine one or more entries for FDS 152. A respective entry in FDS 152 can include a route and a next-hop switch associated with the prefix route. Switch 103 can differentiate the prefixes learned from access layer 108 and border switches 101 and 102. Routing protocol instance 144 can be configured with information (e.g., the tunnel endpoint IP address) associated with switches in access layer 108 to identify the access switches of fabric 110. Accordingly, when switch 103 receives a route advertisement from switches 104 and 105, switch 103 can determine the route as a route from an access switch. Alternatively, routes originating from switch 106 (e.g., a campus core) or external network 120 can carry an extended community (e.g., BGP extended community) flag indicating that the route is from a border switch.

If the next-hop switch is outside of fabric 110 (i.e., not a tunnel endpoint associated with VPN 130), the next-hop switch can indicate a next-hop type of "CORE." On the other hand, if the next-hop switch is a local switch (e.g., switch 103), the next-hop switch can indicate a next-hop type of "LOCAL." Here, core and local next hops can be indicated by respective predefined values. For the host prefix routes, if there are multiple next-hop switches, FDS 152 can indicate one of them in the corresponding entry. FDS 152, hence, can include respective entries for prefix routes 202, 204, and 206 with "CORE" as the next hop, host route 212 with "LOCAL" as the next hop, and prefix routes 222 and 224 with next-hop switches 105 and 104, respectively. FDS 152 can also include respective entries for host routes 214, 216, and 218 with next-hop switches 105, 104, and 105, respectively.

Switch 103 can then program a respective prefix route from FDS 152 to forwarding hardware 150. The routes with a "CORE" as a next-hop switch can be programmed as regular forwarding entries. For prefix routes associated with subnets 222 and 224, switch 103 can include an additional rule that instructs forwarding hardware 150 to promote a packet with an IP address matching the entries from data plane 156 to control plane 140. This allows forwarding hardware 150 to promote the forwarding decision to FDS 152 when the destination IP address of the packet matches an entry in forwarding hardware 150. Therefore, the rule can be a reference to FDS 152. It should be noted that forwarding hardware 150 may support a larger storage space for prefix routes in comparison with host routes. In particular, since the looking-up process can be different for prefix and host routes, forwarding hardware 150 may maintain separate tables for prefix and host routes.

Figure 2B:
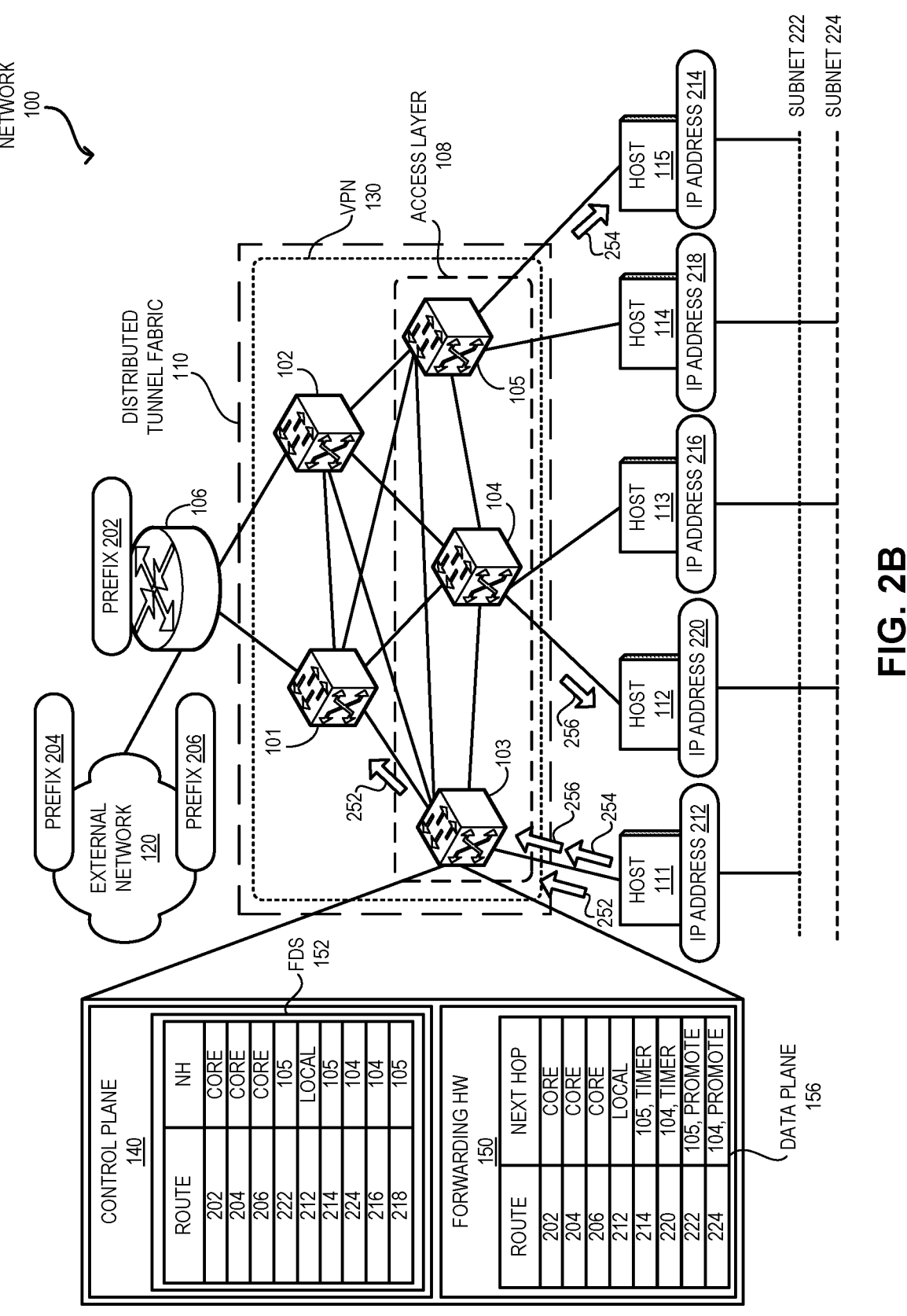
FIG. 2B illustrates an example of an access switch selectively programming host routes into the local forwarding hardware based on inter-host traffic, in accordance with an aspect of the present application.

FIG. 2B illustrates an example of an access switch selectively programming host routes into the local forwarding hardware based on inter-host traffic, in accordance with an aspect of the present application. During operation, host 111 can send a packet 252 toward external network 120. Forwarding hardware 150 can look up the destination address of packet 252. Suppose that the looking-up operation finds a match for prefix 204. Forwarding hardware 150 can then determine that the next-hop switch is in the core, which is reachable via border switches 101 and 102. Accordingly, switch 103 can forward packet 252 toward switch 101. Host 111 can send another packet 254 to host 115. Hence, the destination IP address of packet 254 can include IP address 214.

Upon receiving packet 254, forwarding hardware 150 can look up IP address 214, which can match the entry associated with subnet 222. Forwarding hardware 150 can determine that switch 105 is the next-hop switch. Accordingly, switch 103 can forward packet 254 to switch 105. The looking-up operation also matches a rule that instructs forwarding hardware 150 to promote packet 254 to control plane 140. Switch 103 can also send IP address 214 to control plane 140 instead of promoting packet 254 in its entirety for performing the looking-up operation. For example, forwarding hardware 150 can send a message with IP address 214 to control plane 140, which can trigger the looking-up operation at control plane 140.

Switch 103 can then look up IP address 214 in FDS 152, which can find a match (e.g., based on a longest-prefix match) for the host route indicated by IP address 214. Switch 103 can then program the host route into forwarding hardware 150 with switch 105 as the next-hop switch in an entry. Forwarding hardware 150 can also initiate a timer for the entry. If forwarding hardware 150 does not observe packets destined to IP address 214 for a predetermined period, the timer can expire, and the entry can be removed from forwarding hardware 150. Since switch 103 does not need to exchange any protocol messages for programming forwarding hardware 150 with the host route, programming forwarding hardware 150 can be executed quickly.

In network 100, a host can also be silent. For example, host 112, which can be associated with IP address 220 belonging to subnet 224, may not advertise its host route. As a result, FDS 152 may not have an entry for the host route. If host 111 sends a packet 256 to host 112, switch 103 can receive packet 256. Forwarding hardware 150 can look up IP address 220, which can match the entry associated with subnet 224. Forwarding hardware 150 can determine that switch 104 is the next-hop switch. Accordingly, switch 103 can forward packet 256 to switch 104. The looking-up operation also matches the rule that instructs forwarding hardware 150 to promote packet 256 (or IP address 220) to control plane 140. Switch 103 can then look up IP address 214 in FDS 152, which does not match an entry.

Switch 103 can then generate a host route for IP address 220 and use switch 104 as the next-hop switch since switch 104 is the next-hop switch associated with the prefix route for subnet 224. Switch 103 can then program the host route into forwarding hardware 150 with switch 104 as the next-hop switch in an entry. Forwarding hardware 150 can also initiate a timer for the entry. If forwarding hardware 150 does not observe packets destined to IP address 220 for a predetermined period, the timer can expire, and the entry can be removed from forwarding hardware 150. As a result, subsequent packets destined to IP address 220 are not promoted to control plane 140. Furthermore, unlike conventional techniques, all known host routes associated with subnet 224 do not need to be programmed into forwarding hardware 150. In this way, switch 103 can efficiently program a host route of a silent host.

Figure 3A:
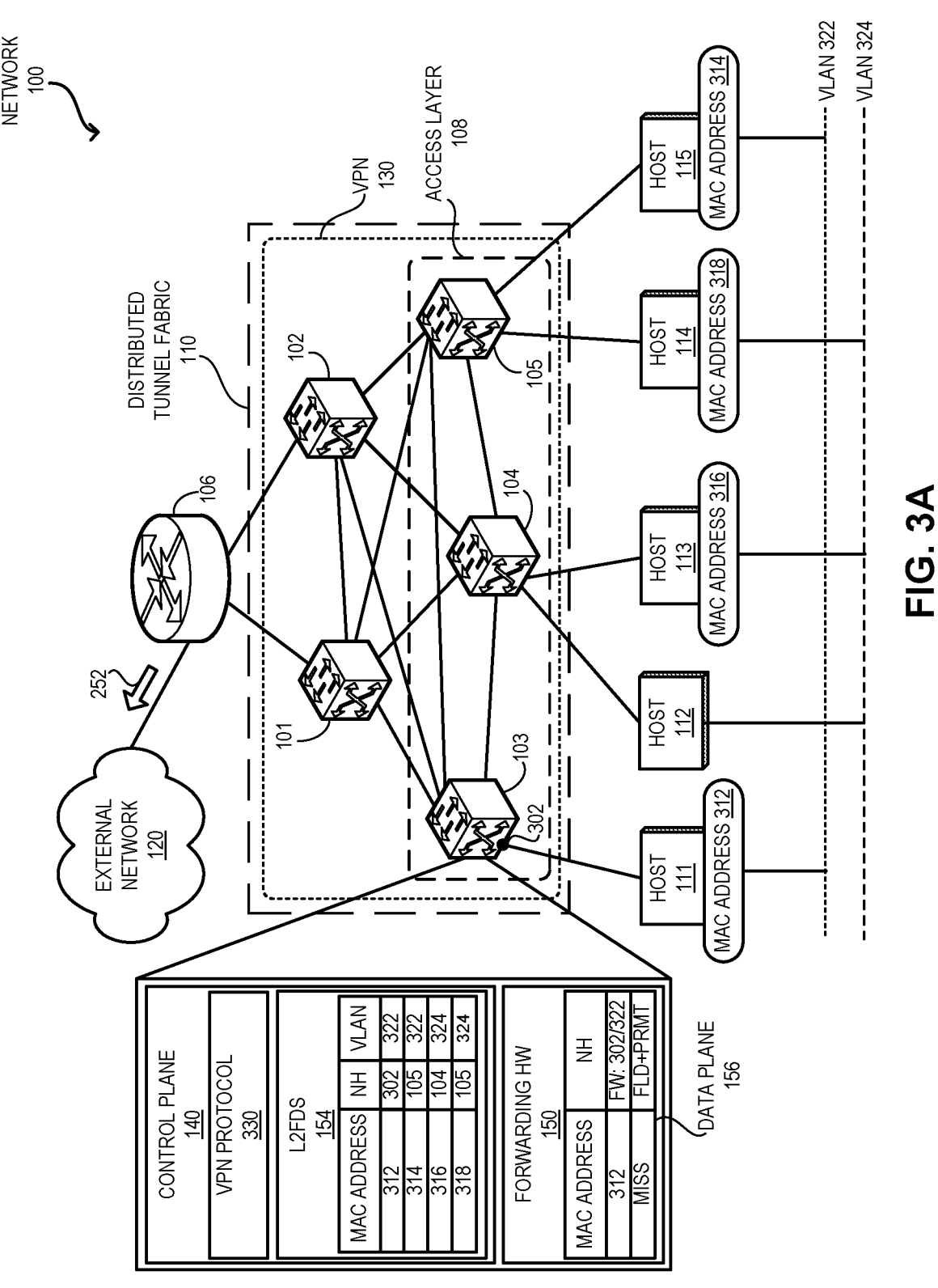
FIG. 3A illustrates an example of an access switch supporting selective programming of learned host media access control (MAC) addresses into the local forwarding hardware, in accordance with an aspect of the present application.

In network 100, the volume of intra-VLAN traffic among hosts can be low. Hence, the layer-2 forwarding table (e.g., the MAC address table) in forwarding hardware 150 can also be selectively programmed. FIG. 3A illustrates an example of an access switch supporting selective programming of learned host MAC addresses into the local forwarding hardware, in accordance with an aspect of the present application. Hosts 111, 113, 114, and 115 can be allocated with MAC addresses 312, 316, 318, and 314, respectively. In this example, hosts 111 and 115 can belong to VLAN 322, and hosts 112, 113, and 114 can belong to VLAN 324. Host 112 may not communicate with fabric 110. As a result, the MAC address of host 112 may not be learned by fabric 110. To operate in VPN 130, switch 103 can run a VPN protocol instance 330, which can be the same as routing protocol instance 144 of FIG. 1. Protocol instance 330 can learn a respective MAC address learned at other switches of VPN 130.

During operation, switch 103 can learn MAC address 312 from a local port 302 on VLAN 322. Switch 103 can then store MAC addresses 312 in L2FDS 154 in association with port 302 and VLAN 322. Switch 103 can also learn MAC addresses 314, 316, and 318 from switches 105, 104, and 105, respectively, via VPN protocol instance 330. Switch 103 can then store MAC addresses 314, 316, and 318 in L2FDS 154 with corresponding next-hop switches 105, 104, and 105, respectively, and VLANs 322, 324, and 324, respectively. For facilitating data plane 156, switch 103 can program the locally learned MAC addresses in forwarding hardware 150. For example, switch 103 can program MAC addresses 312 in an entry in forwarding hardware 150 with VLAN 322 and a next hop indicated by port 302.

However, instead of programming MAC addresses learned from VPN 130, switch 103 can program a rule for MAC address misses. The rule can instruct forwarding hardware 150 to promote a packet with whose MAC address is absent in forwarding hardware 150 from data plane 156 to control plane 140. This allows forwarding hardware 150 to promote the forwarding decision to L2FDS 154 when the destination MAC address of the packet does not match an entry in forwarding hardware 150. Hence, the rule can be a reference to L2FDS 154. The rule can also instruct forwarding hardware 150 to flood the packet in the corresponding VLAN to ensure delivery of the initial inter-host packet. Since the flooding is only for the first packet of an inter-host packet flow, which can be rare, the number of packets being flooded due to the selective MAC address programming can be low.

Figure 3B:
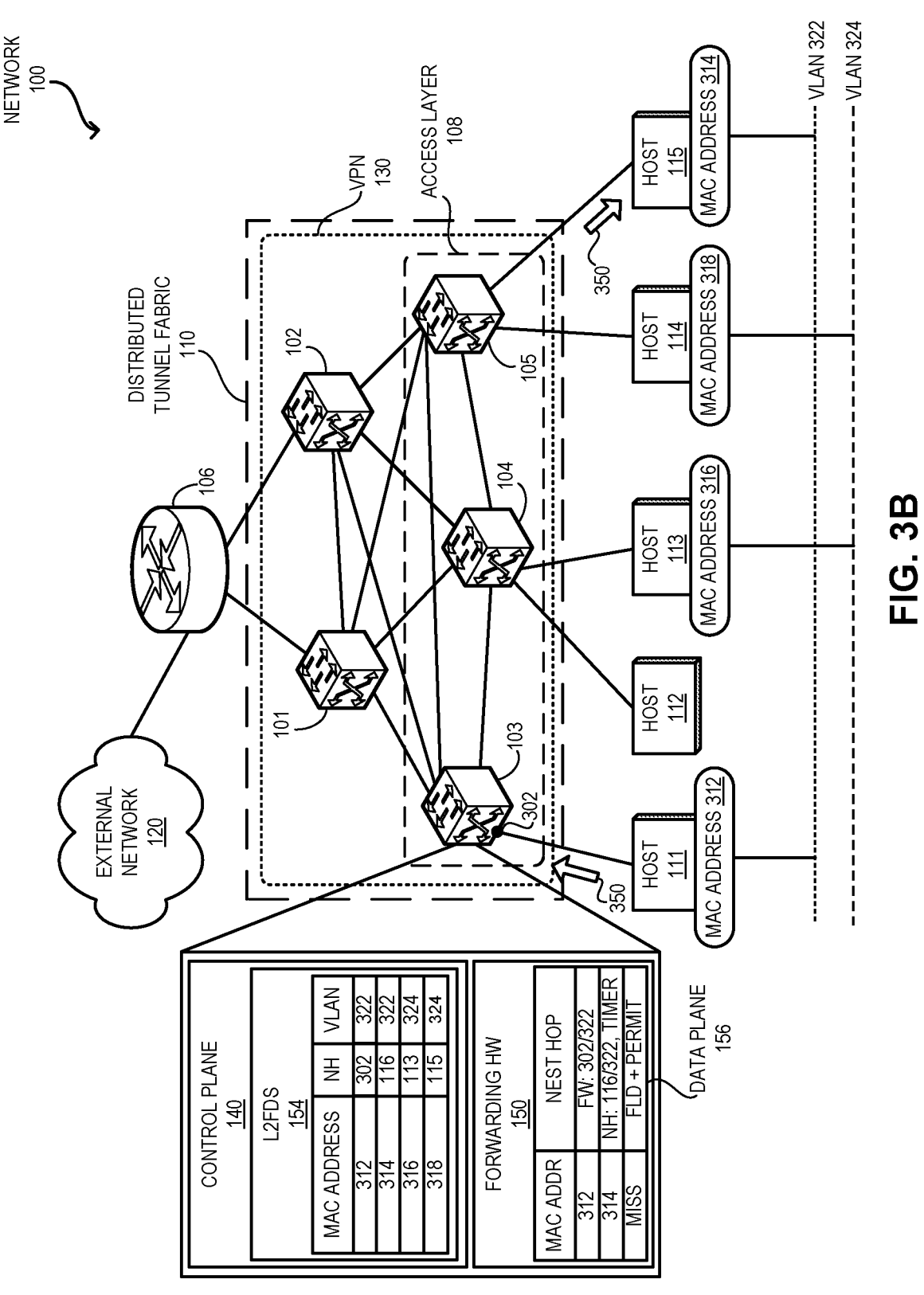
FIG. 3B illustrates an example of an access switch selectively programming learned host MAC addresses into the local forwarding hardware based on inter-host traffic, in accordance with an aspect of the present application.

FIG. 3B illustrates an example of an access switch selectively programming learned host MAC addresses into the local forwarding hardware based on inter-host traffic, in accordance with an aspect of the present application. During operation, host 111 can send a packet 350 to host 115. Hence, the destination MAC address of packet 350 can include MAC address 314. Upon receiving packet 350, forwarding hardware 150 can look up MAC address 314, which may not match an entry. Forwarding hardware 150 can then flood packet 350 in VLAN 322 by sending the packet to a respective port and tunnel endpoint configured with VLAN 322. The MAC address lookup miss can also trigger the rule that instructs forwarding hardware 150 to promote packet 350 to control plane 140. Switch 103 can also send MAC address 314 (e.g., via a message) to control plane 140 instead of promoting packet 350 in its entirety for performing the looking-up operation.

Switch 103 can then look up MAC address 314 in L2FDS 154, which can find a match for MAC address 314. Switch 103 can then program MAC address 314 into an entry in forwarding hardware 150 based on the corresponding entry in L2FDS 154. The entry forwarding hardware 150 can indicate switch 105 as the next-hop switch and VLAN 322 as the VLAN associated with MAC address 314. Forwarding hardware 150 can also initiate a timer for the entry. If forwarding hardware 150 does not observe packets destined to MAC address 314 for a predetermined period, the timer can expire, and the entry can be removed from forwarding hardware 150.

Figure 4A:
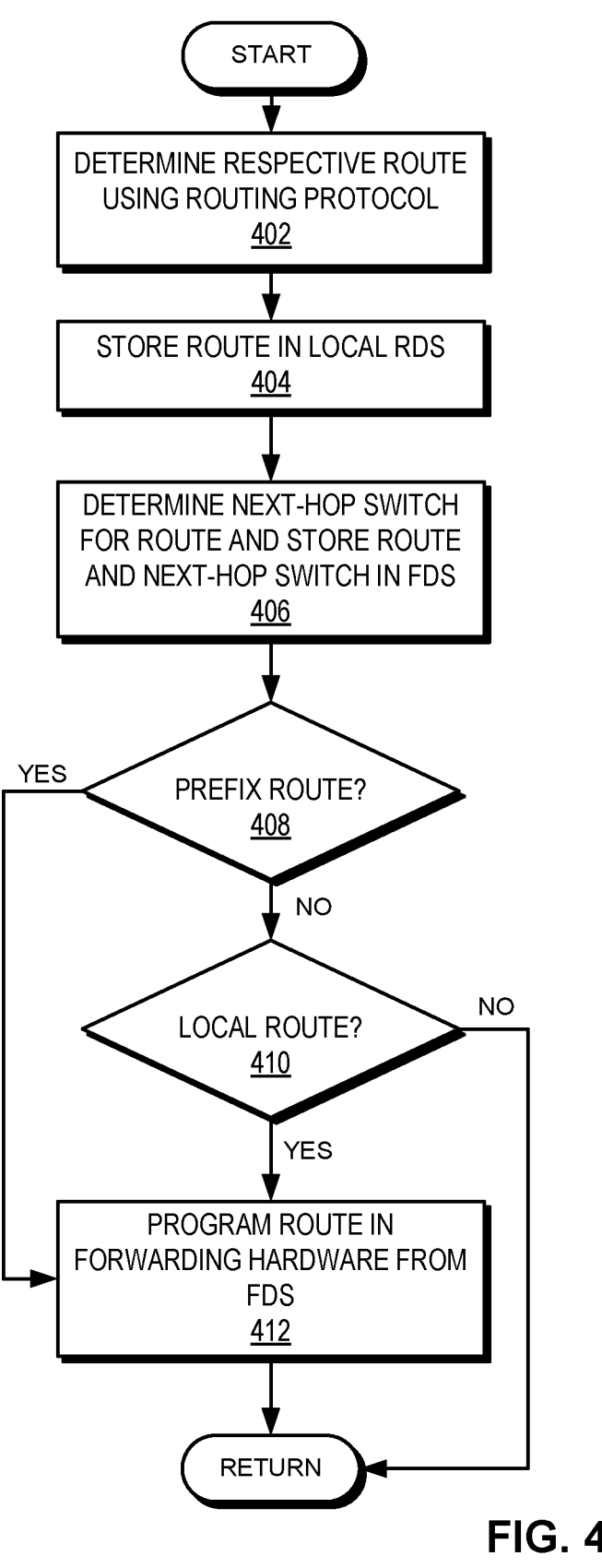
FIG. 4A presents a flowchart illustrating the process of an access switch storing route information in a forwarding data structure and programming selected routes into the local forwarding hardware, in accordance with an aspect of the present application.

FIG. 4A presents a flowchart illustrating the process of an access switch storing route information in a forwarding data structure and programming selected routes into the local forwarding hardware, in accordance with an aspect of the present application. During operation, the switch can determine a respective route using a routing protocol (operation 402) and store the route in a local RDS (operation 404). The switch can then determine the next-hop switch for the route and store the route and the next-hop switch in the FDS (operation 406). The switch can then determine whether the route is a prefix route (operation 408). If the route is not a prefix route, the route can be a host route. The switch can then determine whether the route is a local route (operation 410). If the route is a prefix route (operation 408) or a local host route (operation 410), the switch can program the route in the forwarding hardware from the FDS (operation 412).

Figure 4B:
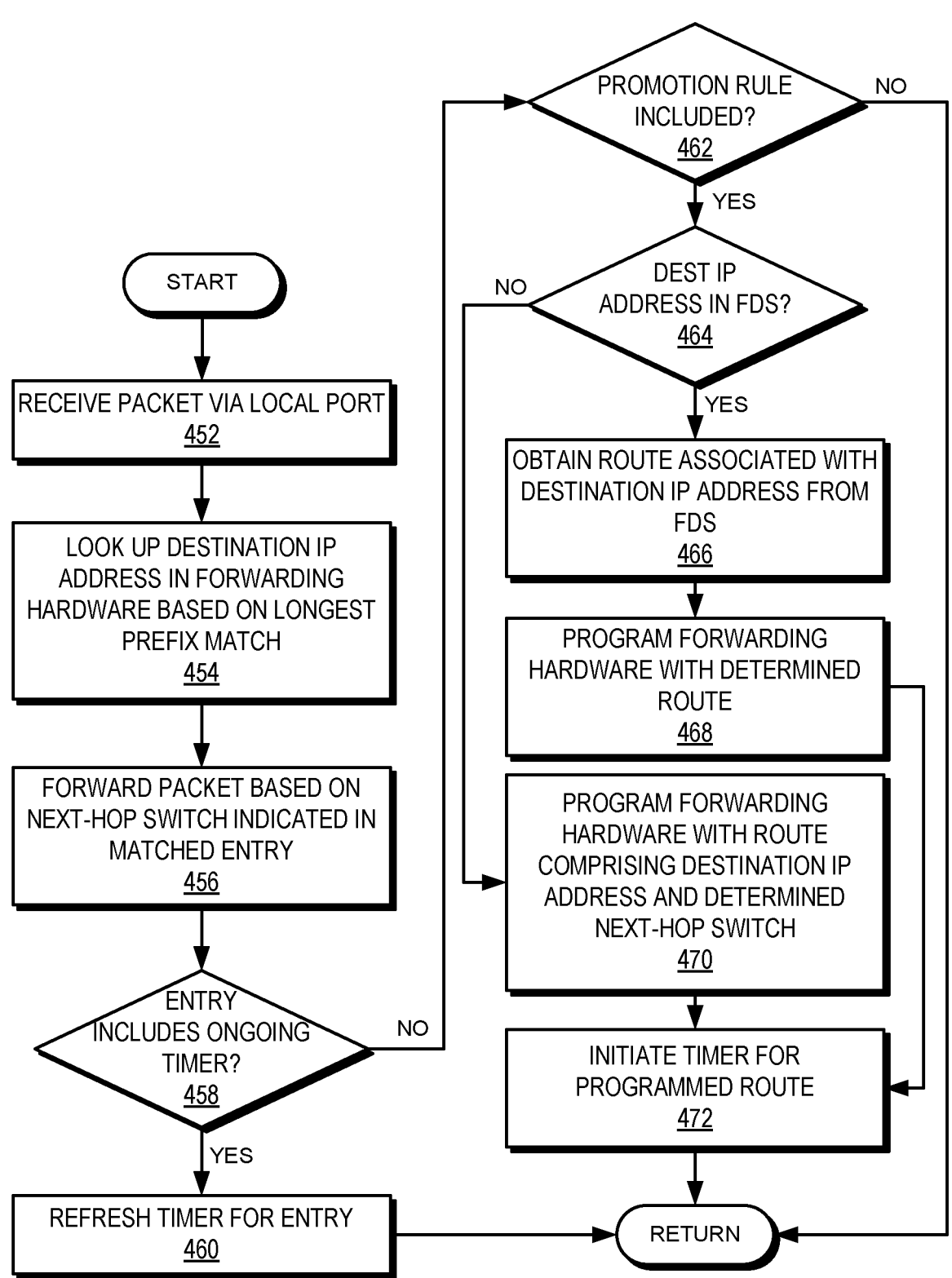
FIG. 4B presents a flowchart illustrating the process of an access switch programming a host route into the local forwarding hardware based on corresponding inter-host traffic, in accordance with an aspect of the present application.

FIG. 4B presents a flowchart illustrating the process of an access switch programming a host route into the local forwarding hardware based on corresponding inter-host traffic, in accordance with an aspect of the present application. During operation, the switch can receive a packet via a local port (operation 452) and look up the destination IP address of the packet in the forwarding hardware based on the longest-prefix match (operation 454). The switch can then forward the packet based on the next-hop switch indicated in the matched entry (operation 456). The switch can also determine whether there is an ongoing timer for the entry (operation 458). If there is an ongoing timer, the switch can refresh the timer (operation 460). On the other hand, if there is not an ongoing timer, the switch can determine whether a promotion rule is included in the entry (operation 462).

If a promotion rule is included, the looking-up process is also promoted to the control plane. The switch can then determine whether the destination IP address is in the FDS (operation 464). If the IP address is in the FDS, the switch can obtain a route associated with the destination IP address from the FDS (operation 466) and program the forwarding hardware with the determined route (operation 468). However, if the IP address is not in the FDS, the corresponding host can be a silent host. The switch can then program the forwarding hardware with a route comprising the destination IP address and the determined next-hop switch (e.g., from the prefix route) (operation 470). Upon programming a route in the forwarding hardware (operation 468 or 470), the switch can initiate a timer for the programmed route (operation 472).

Figure 5A:
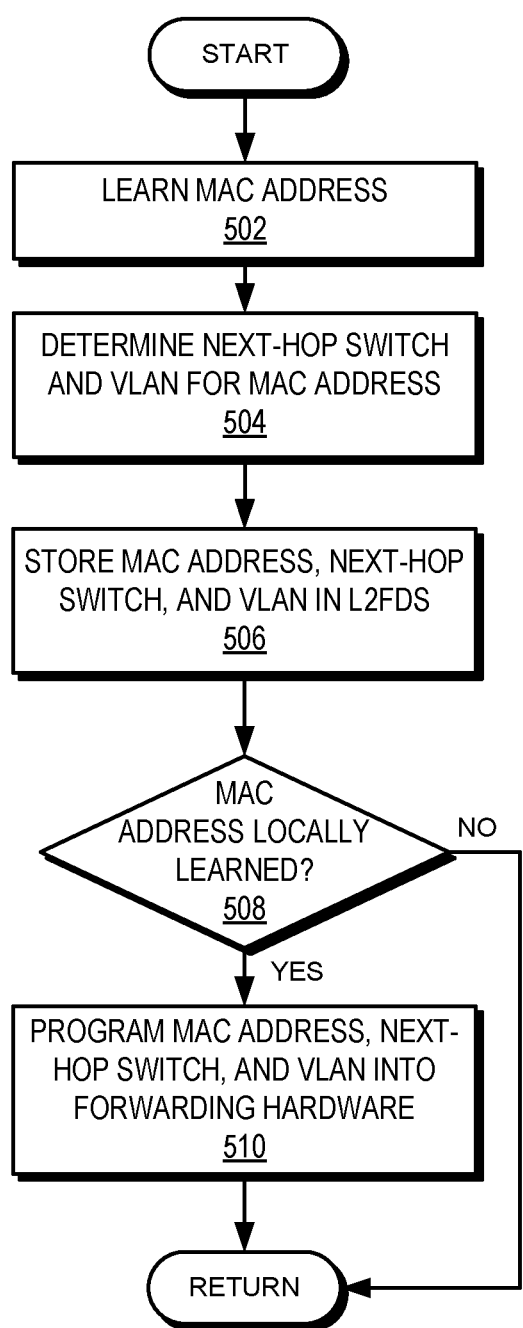
FIG. 5A presents a flowchart illustrating the process of an access switch storing learned host MAC addresses in a layer-2 forwarding data structure, in accordance with an aspect of the present application.

FIG. 5A presents a flowchart illustrating the process of an access switch storing learned host MAC addresses in a layer-2 forwarding data structure, in accordance with an aspect of the present application. During operation, the switch can learn a MAC address (operation 502) and determine the next-hop switch and a VLAN for the MAC address (operation 504). The switch can then store the MAC address, the next-hop switch, and the VLAN (e.g., a VLAN identifier) in the L2FDS (operation 506). The switch can also determine whether the MAC address is locally learned (e.g., from a local port) (operation 508). If the MAC address is locally learned, the switch can program the MAC address, the next-hop switch (e.g., a local port), and a VLAN in an entry in the forwarding hardware (operation 510). It should be noted that the forwarding hardware can be pre-programmed with a rule for flooding and promoting a packet with a missed MAC address lookup.

Figure 5B:
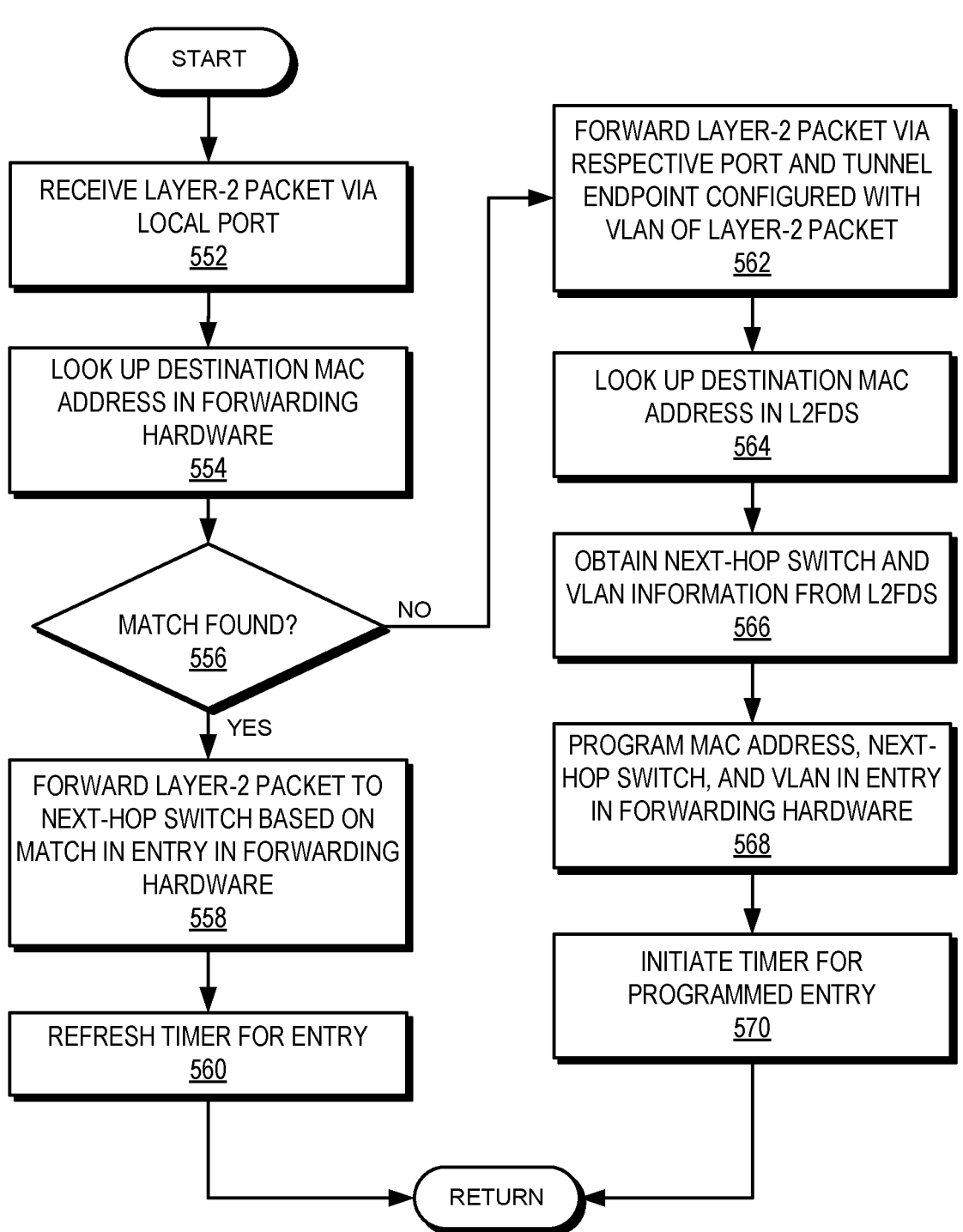
FIG. 5B presents a flowchart illustrating the process of an access switch programming a host MAC address into the local forwarding hardware based on corresponding inter-host traffic, in accordance with an aspect of the present application.

FIG. 5B presents a flowchart illustrating the process of an access switch programming a host MAC address into the local forwarding hardware based on corresponding inter-host traffic, in accordance with an aspect of the present application. During operation, the switch can receive a layer-2 packet via a local port (operation 552) and look up the destination MAC address in the forwarding hardware (operation 554). The switch can then determine whether a match is found (operation 556). If a match is found, the switch can forward the layer-2 packet to the next-hop switch based on the match in the forwarding hardware (operation 558). The switch can then refresh the timer for the entry (operation 560)

On other hand, if a match is not found, the packet is with a missed MAC address lookup. The switch can then forward the layer-2 packet via a respective port and tunnel endpoint configured with a VLAN of the layer-2 packet (operation 562). The switch can then look up the destination MAC address in the L2FDS (operation 564) and obtain the next-hop switch VLAN information from the L2FDS (operation 566). The switch can then program the MAC address, the next-hop switch, and the VLAN in an entry in the forwarding hardware (operation 568) and initiate a timer for the programmed entry (operation 570).

Figure 6:
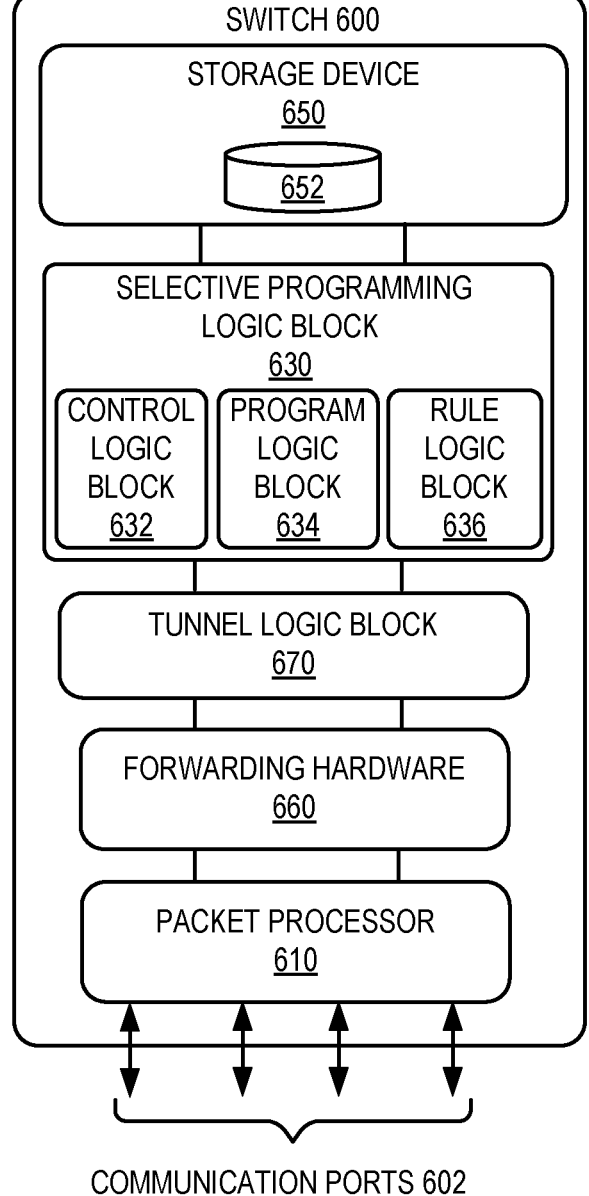
FIG. 6 illustrates an example of a switch supporting selective programming of the forwarding hardware, in accordance with an aspect of the present application.

FIG. 6 illustrates an example of a switch supporting selective programming of the forwarding hardware, in accordance with an aspect of the present application. In this example, a switch 600 can include a number of communication ports 602, a packet processor 610, and a storage device 650. Switch 600 can also include forwarding hardware 660 (e.g., processing hardware of switch 600, such as its application-specific integrated circuit (ASIC) chips), which includes information based on which switch 600 processes packets (e.g., determines output ports for packets). Packet processor 610 can extract and processes header information from the received packets. Packet processor 610 can identify a switch identifier (e.g., a MAC address and/or an IP address) associated with switch 600 in the header of a packet.

Communication ports 602 can include inter-switch communication channels for communication with other switches and/or user devices. The communication channels can be implemented via a regular communication port and based on any open or proprietary format. Communication ports 602 can include one or more Ethernet ports capable of receiving frames encapsulated in an Ethernet header. Communication ports 602 can also include one or more IP ports capable of receiving IP packets. An IP port is capable of receiving an IP packet and can be configured with an IP address. Packet processor 610 can process Ethernet frames and/or IP packets. A respective port of communication ports 602 may operate as an ingress port and/or an egress port.

Switch 600 can maintain a database 652 (e.g., in storage device 650). Database 652 can be a relational database and may run on one or more Database Management System (DBMS) instances. Database 652 can store information associated with routing, configuration, and interface of switch 600. Switch 600 can include a tunnel logic block 670 that can establish a tunnel with a remote switch, thereby allowing switch 600 to operate as a tunnel endpoint. Switch 600 can include a selective programming logic block 630 that can allow switch 600 to selectively program forwarding entries in forwarding hardware 660.

Selective programming logic block 630 can include a control logic block 632, a program logic block 634, and a rule logic block 636. Control plane logic block 632 can learn a respective prefix and host route (e.g., based on a routing protocol) associated with switch 600 and populate the FDS using the learned routes. Program logic block 634 can program a respective prefix route and selectively program a host route into forwarding hardware 660.

Rule logic block 636 can program a rule for promoting a packet (or its destination IP address) to the control plane for a match with a subnet associated with host routes. When a packet (or its destination IP address) is promoted, control plane logic block 632 can identify a host route or generate a host route for a silent host based on the FDS. Subsequently, program logic block 634 can program the host route in an entry in forwarding hardware 660 and initiate a timer for the entry.

Control plane logic block 632 can learn also learn a respective MAC address (locally or from the VPN routing protocol) and store them in the local L2FDS. Rule logic block 636 can program a rule for flooding and promoting a packet with a missed MAC address lookup into forwarding hardware 660. When a packet (or its destination MAC address) is promoted, control plane logic block 632 can identify the destination MAC address in the FDS. Subsequently, program logic block 634 can program the MAC address in an entry in forwarding hardware 660 and initiate a timer for the entry.

One aspect of the present technology can provide a system for selectively programming the forwarding hardware of a switch. During operation, the system can operate the switch as a tunnel endpoint of a tunnel in conjunction with a remote switch. The tunnel can facilitate a virtual private network (VPN) coupling the switch and the remote switch. The VPN can include a set of access switches that couples hosts to the VPN and includes the switch. The system can determine, using a routing protocol instance facilitating layer-3 routing for the VPN at the switch, a set of routes for the VPN. The system can maintain the set of routes in a first data structure in an application space of the routing protocol instance. The set of routes can include a first subset of routes associated with remote hosts of the VPN and a second subset of routes comprising the rest of the set of routes. The system can then program the second subset routes in the forwarding hardware. Upon receiving a packet destined to a remote host, the system can determine a route associated with the remote host from the first set of routes and program the route in the forwarding hardware of the switch.

In a variation on this aspect, the second subset of routes comprises one or more of: a host route to a locally coupled host and a prefix route to an external network prefix.

In a variation on this aspect, the system can initiate a timer for the route programmed in the forwarding hardware. The timer can indicate whether a packet received at the forwarding hardware corresponds to the route. If the timer expires, the system can remove the route from the forwarding hardware.

In a variation on this aspect, the first subset of routes can include a host route to a host coupled to a remote switch of the VPN, and the second subset of routes can include a prefix route corresponding to the host route. The system can then program a first reference to the first data structure in association with the prefix route in the forwarding hardware.

In a further variation, the route can be the host route. If the destination address of the packet matches the subnet, the system can obtain the host route from the first data structure and program the host route in the forwarding hardware.

In a variation on this aspect, upon receiving a second packet destined to a second remote host, the system can determine that no host route associated with the second remote host is present in the first set of routes. The system can then generate a host route for the second remote host based on a subnet of the second remote host and program the host route in the forwarding hardware of the switch.

In a variation on this aspect, the system can receive a media access control (MAC) address learned at a remote access switch associated with the VPN. The system can then store the MAC address in a second data structure in a layer-2 application space of the switch.

In a further variation, the system can program a second reference to the second data structure for a respective MAC address lookup miss in the forwarding hardware.

In a further variation, if a destination MAC address of a second packet matches the MAC address, the system can obtain the MAC address from the second data structure and program the MAC address in the forwarding hardware.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

The methods and processes described herein can be executed by and/or included in hardware logic blocks or apparatus. These logic blocks or apparatus may include, but are not limited to, an application-specific integrated circuit (ASIC) chip, a field-programmable gate array (FPGA), a dedicated or shared processor that executes a particular software logic block or a piece of code at a particular time, and/or other programmable-logic devices now known or later developed. When the hardware logic blocks or apparatus are activated, they perform the methods and processes included within them.

The foregoing descriptions of examples of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method comprising:
    operating, by a first network device, an endpoint of a tunnel in conjunction with a second network device, wherein the tunnel facilitates a virtual private network (VPN) coupling the first network device and the second network device, wherein the VPN includes a set of access network devices that couples hosts to the VPN and includes the first and second network devices;

determining, by a routing protocol instance facilitating layer-3 routing for the VPN at the first network device, a set of routes for the VPN;

maintaining the set of routes in a first data structure in an application space of the routing protocol instance, wherein the set of routes includes a first subset of routes associated with remote hosts of the VPN and a second subset of routes comprising a remaining subset of the set of routes;

programming forwarding hardware of the first network device with the second subset of routes;

receiving a packet destined to a remote host coupled to the second network device; and in response to receiving the packet:
    determining a route associated with the remote host from the first subset of routes in the first data structure; and
    programming the forwarding hardware of the first network device with the route.

2. The method of claim 1, wherein the second subset of routes comprises one or more of: a host route to a locally coupled host and a prefix route to an external network prefix.

3. The method of claim 1, further comprising:

initiating, in the forwarding hardware, a timer for the route, wherein the timer indicates whether a packet received at the forwarding hardware corresponds to the route; and in response to an expiration of the timer, removing the route from the forwarding hardware.

4. The method of claim 1, wherein the first subset of routes comprises a host route to the remote host coupled to second network device, and wherein the second subset of routes comprises a prefix route corresponding to the host route;

wherein the method further comprises programming the forwarding hardware with a first reference to the first data structure in association with the prefix route.

5. The method of claim 4, wherein the route associated with the remote host is the host route, and wherein programming the forwarding hardware with the route comprises:

determining that a destination address of the packet matches the prefix route;

obtaining the host route from the first data structure; and programming the host route in the forwarding hardware.

6. The method of claim 1, further comprising:

in response to receiving a second packet destined to a second remote host, determining that no host route associated with the second remote host is present in the first subset of routes;

generating a second host route for the second remote host based on a subnet of the second remote host;

programming the forwarding hardware of the first network device with the second host route.

7. The method of claim 1, further comprising:

receiving a media access control (MAC) address learned at the second network device; and storing the MAC address in a second data structure in a layer-2 application space of the first network device.

8. The method of claim 7, further comprising programming the forwarding hardware with a second reference to the second data structure for a respective MAC address lookup miss at the forwarding hardware.

9. The method of claim 8, wherein, in response to a destination MAC address of a third packet matching the MAC address, the method further comprises:

obtaining the MAC address from the second data structure; and programming the forwarding hardware with an entry comprising the MAC address.

10. A non-transitory computer-readable storage medium storing instructions that when executed by a computer cause the computer to perform a method, the method comprising:

operating a first network device as an endpoint of a tunnel in conjunction with a second network device, wherein the tunnel facilitates a virtual private network (VPN) coupling the first network device and the second network device, wherein the VPN includes a set of access network devices that couples hosts to the VPN and includes the first and second network devices;

determining, by a routing protocol instance facilitating layer-3 routing for the VPN at the first network device, a set of routes for the VPN;

maintaining the set of routes in a first data structure in an application space of the routing protocol instance, wherein the set of routes includes a first subset of routes associated with remote hosts of the VPN and a second subset of routes comprising a remaining subset of the set of routes;

programming forwarding hardware of the first network device with the second subset of routes;

receiving a packet destined to a remote host coupled to the second network device; and in response to receiving the packet:
    determining a route associated with the remote host from the first subset of routes in the first data structure; and
    programming the forwarding hardware of the first network device with the route.

11. The non-transitory computer-readable storage medium of claim 10, wherein the second subset of routes comprises one or more of: a host route to a locally coupled host and a prefix route to an external network prefix.

12. The non-transitory computer-readable storage medium of claim 10, wherein the method further comprises:

initiating, in the forwarding hardware, a timer for the route, wherein the timer indicates whether a packet received at the forwarding hardware corresponds to the route; and in response to an expiration of the timer, removing the route from the forwarding hardware.

13. The non-transitory computer-readable storage medium of claim 10, wherein the first subset of routes comprises a host route to the remote host coupled to the second network device, and wherein the second subset of routes comprises a prefix route corresponding to the host route;

wherein the method further comprises programming the forwarding hardware with a first reference to the first data structure in association with the prefix route.

14. The non-transitory computer-readable storage medium of claim 13, wherein the route associated with the remote host is the host route, and wherein programming the forwarding hardware with the route comprises:

determining that a destination address of the packet matches the prefix route;

obtaining the host route from the first data structure; and programming the host route.

15. The non-transitory computer-readable storage medium of claim 10, wherein the method further comprises:

in response to receiving a second packet destined to a second remote host, determining that no host route associated with the second remote host is present in the first set of routes;

generating a second host route for the second remote host based on a subnet of the second remote host;

programming the forwarding hardware of the first network device with the second host route.

16. The non-transitory computer-readable storage medium of claim 10, wherein the method further comprises:

receiving a media access control (MAC) address learned at the second network device; and storing the MAC address in a second data structure in a layer-2 application space of the first network device.

17. The non-transitory computer-readable storage medium of claim 16, wherein the method further comprises programming the forwarding hardware with a second reference to the second data structure for a respective MAC address lookup miss at the forwarding hardware.

18. The non-transitory computer-readable storage medium of claim 17, wherein, in response to a destination MAC address of a third packet matching the MAC address, the method further comprises:

obtaining the MAC address from the second data structure; and programming the forwarding hardware with an entry comprising the MAC address.

19. A network device, comprising:

a processor;

forwarding hardware; and a non-transitory computer-readable storage medium storing instructions that when executed by the processor cause the network device to perform a method, the method comprising:

operating the network device as an endpoint of a tunnel in conjunction with a remote network device, wherein the tunnel facilitates a virtual private network (VPN) coupling the network device and the remote network device, wherein the VPN includes a set of access network devices that couples hosts to the VPN and includes the network device and the remote network device;

determining, using a routing protocol instance facilitating layer-3 routing for the VPN at the network device, a set of routes for the VPN; and maintaining the set of routes in a first data structure in an application space of the routing protocol instance, wherein the set of routes includes a first subset of routes associated with remote hosts of the VPN and a second subset of routes comprising a remaining subset of the set of routes; and programming the forwarding hardware with the second subset of routes; and receiving a packet destined to a remote host coupled to the remote network device; and in response to receiving the packet:

determining a route associated with the remote host from the first subset of routes; and programming the forwarding hardware with the route.

20. The network device of claim 19, wherein the method further comprises:

receiving a media access control (MAC) address learned at the remote network device; and storing the MAC address in a second data structure in a layer-2 application space of the network device;

in response to a destination MAC address of a second packet matching the MAC address, obtaining the MAC address from the second data structure; and programming the forwarding hardware with an entry comprising the MAC address.

* * * * *